United States Patent
Hamdy

(10) Patent No.: US 10,455,435 B2
(45) Date of Patent: Oct. 22, 2019

(54) MOBILE SITE PLATFORM WITH DESCENDING CAPABILITY

(71) Applicant: CommScope Technologies LLC, Hickory, NC (US)

(72) Inventor: Mohamed Nadder Hamdy, Dubai (AE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/695,384

(22) Filed: Sep. 5, 2017

(65) Prior Publication Data

US 2018/0070248 A1    Mar. 8, 2018

Related U.S. Application Data

(60) Provisional application No. 62/385,078, filed on Sep. 8, 2016.

(51) Int. Cl.
| | |
|---|---|
| *H04W 24/00* | (2009.01) |
| *H04W 24/02* | (2009.01) |
| *F16M 11/04* | (2006.01) |
| *F16M 11/18* | (2006.01) |
| *H04W 16/26* | (2009.01) |
| *H04W 24/04* | (2009.01) |
| *H01Q 1/12* | (2006.01) |
| *H04W 88/08* | (2009.01) |
| *H01Q 1/24* | (2006.01) |

(52) U.S. Cl.
CPC .......... *H04W 24/02* (2013.01); *F16M 11/046* (2013.01); *F16M 11/18* (2013.01); *H01Q 1/1242* (2013.01); *H04W 16/26* (2013.01); *H04W 24/04* (2013.01); *H01Q 1/246* (2013.01); *H04W 88/085* (2013.01)

(58) Field of Classification Search
CPC ...... F16M 11/046; F16M 11/18; H01Q 1/246; H04W 16/26; H04W 24/02; H04W 24/04; H04W 88/085
USPC ............................. 455/561; 52/118; 248/188
See application file for complete search history.

(56) References Cited

U.S. PATENT DOCUMENTS

| | | | | |
|---|---|---|---|---|
| 2,632,530 A | * | 3/1953 | Wagner .................. | B66F 11/04 182/14 |
| 3,377,595 A | * | 4/1968 | Carr ...................... | H01Q 1/1235 343/713 |
| 3,945,597 A | * | 3/1976 | Klein ..................... | F16M 11/10 248/327 |

(Continued)

OTHER PUBLICATIONS

Notification of Transmittal of the International Search Report and the Written Opinion of the International Searching Authority, or the Declaration corresponding to International Application No. PCT/US2017/050013 dated Feb. 13, 2019.

(Continued)

*Primary Examiner* — Charles T Shedrick
(74) *Attorney, Agent, or Firm* — Myers Bigel, P.A.

(57) ABSTRACT

A mobile communications site, comprising: a vertical mounting structure resting on an underlying surface; a platform mounted to the vertical mounting structure; one or more electronic communications components mounted on the platform; and an elevation mechanism attached to the platform and configured to move the platform relative to the mounting structure between raised and lowered positions relative to the underlying surface.

16 Claims, 3 Drawing Sheets

(56) References Cited

U.S. PATENT DOCUMENTS

| | | | | |
|---|---|---|---|---|
| 4,943,019 A * | 7/1990 | Mester | B66F 11/048 | 248/123.11 |
| 5,018,009 A * | 5/1991 | Koerv | F16M 11/18 | 104/295 |
| 5,166,696 A * | 11/1992 | Rupp | H01Q 1/081 | 343/711 |
| 5,425,068 A * | 6/1995 | Schaefer | A61B 6/4441 | 378/193 |
| 5,615,855 A * | 4/1997 | Marue | B60P 3/18 | 248/188.5 |
| RE37,559 E * | 2/2002 | Marue | B60P 3/18 | 248/188.5 |
| 6,460,795 B1 * | 10/2002 | Brown, Jr. | B65H 75/38 | 191/12.2 R |
| 7,000,357 B1 * | 2/2006 | Stearns | H01Q 1/1235 | 52/110 |
| 7,337,885 B2 * | 3/2008 | Stow | F15B 15/1409 | 188/289 |
| 7,574,832 B1 * | 8/2009 | Lieberman | E04H 12/10 | 212/350 |
| 8,695,286 B2 * | 4/2014 | Falck-Schmidt | H01Q 1/1235 | 52/114 |
| 9,249,921 B1 | 2/2016 | Wurtenberger et al. | | |
| 9,369,881 B1 * | 6/2016 | Chukka | H04W 16/28 | |
| 9,376,857 B1 * | 6/2016 | Baumgartner | F16M 11/28 | |
| 9,891,506 B1 * | 2/2018 | Wei | G03B 17/561 | |
| 9,999,295 B1 * | 6/2018 | Game | A47B 21/04 | |
| 2002/0139064 A1 * | 10/2002 | Norwood | B66C 23/703 | 52/118 |
| 2003/0160731 A1 * | 8/2003 | Wensink | H01Q 1/125 | 343/892 |
| 2004/0075736 A1 * | 4/2004 | Yuasa | F16M 11/18 | 348/61 |
| 2005/0093766 A1 * | 5/2005 | Turner | H01Q 1/1235 | 343/900 |
| 2005/0097833 A1 * | 5/2005 | Campbell | H01Q 1/10 | 52/118 |
| 2006/0194621 A1 * | 8/2006 | Seshadri | H04W 88/02 | 455/569.1 |
| 2006/0201076 A1 * | 9/2006 | Blackwelder | E04H 12/182 | 52/118 |
| 2008/0259541 A1 * | 10/2008 | Woodward | F16G 13/16 | 361/679.02 |
| 2009/0154653 A1 * | 6/2009 | Fink | A61B 6/447 | 378/197 |
| 2010/0146873 A1 * | 6/2010 | Keller | E04H 12/182 | 52/111 |
| 2010/0189531 A1 * | 7/2010 | Christensen | E02D 27/42 | 414/10 |
| 2011/0185647 A1 * | 8/2011 | Diniz | E04H 9/16 | 52/111 |
| 2011/0225804 A1 * | 9/2011 | Clifford | H01Q 1/1207 | 29/593 |
| 2011/0237871 A1 * | 9/2011 | Augarten | A61F 5/0059 | 600/37 |
| 2012/0169558 A1 * | 7/2012 | Huang | G01R 31/002 | 343/766 |
| 2012/0187256 A1 * | 7/2012 | Ergun | A47B 9/12 | 248/123.11 |
| 2012/0217058 A1 * | 8/2012 | Higby | H02G 11/02 | 174/70 R |
| 2013/0057651 A1 * | 3/2013 | Ueland | H01Q 1/125 | 348/46 |
| 2014/0054436 A1 * | 2/2014 | Cook | H01Q 1/1242 | 248/519 |
| 2014/0217258 A1 * | 8/2014 | Cere' | B65B 11/025 | 248/647 |
| 2014/0370935 A1 * | 12/2014 | Newman | H01Q 1/1235 | 455/562.1 |
| 2015/0357708 A1 * | 12/2015 | Au | H01Q 3/08 | 343/760 |
| 2016/0198842 A1 * | 7/2016 | Kang | F16M 7/00 | 108/1 |
| 2017/0325444 A1 * | 11/2017 | Crinklaw | A01M 7/0089 | |
| 2018/0014419 A1 * | 1/2018 | Sotgiu | F16M 11/18 | |
| 2018/0062239 A1 * | 3/2018 | McCoy | H01Q 1/3216 | |
| 2018/0070248 A1 * | 3/2018 | Hamdy | H04W 24/02 | |
| 2019/0185182 A1 * | 6/2019 | Bei | B64D 47/08 | |

OTHER PUBLICATIONS

International Preliminary Report on Patentability corresponding to International Application No. PCT/US2017/050013 dated Mar. 21, 2019.

* cited by examiner

MOBILE SITE PLATFORM WITH DESCENDING CAPABILITY

RELATED APPLICATION

The present application claims priority from and the benefit of U.S. Provisional Patent Application No. 62/385,078, filled Sep. 8, 2016, the disclosure of which is hereby incorporated herein in its entirety.

FIELD OF THE INVENTION

The present invention relates generally to platforms, and more particularly to mobile communications site platforms.

BACKGROUND

Modern mobile communications base stations mounted to antenna towers or the like typically have a distributed architecture. More specifically, the distributed architecture has a Base Band Unit (BBU) on or near ground level and one or more Remote Radio Units (RRU) mounted on the tower itself (often at the top of the tower). This architecture positions the RRUs closer to the antennas (which are also mounted on the tower), thereby reducing feeder losses and in some instances eliminating the needs for Tower Mounted Amplifiers.

One limitation of this architecture, however, lies in the difficulty of radio maintenance difficulties. Field technicians are often incapable of climbing antenna towers (which may require a certain degree of strength, agility, courage, etc.). Also, this architecture can render testing for return loss and PIM performance difficult. As such, it may be desirable to consider modifications to the typical radio/BBU/RRU/antenna arrangement.

SUMMARY

As a first aspect, embodiments of the invention are directed to a mobile communications site, comprising: a vertical mounting structure resting on an underlying surface; a platform mounted to the vertical mounting structure; one or more mobile communications components mounted on the platform; and an elevation mechanism attached to the platform and configured to move the platform relative to the mounting structure between raised and lowered positions relative to the underlying surface.

As a second aspect, embodiments of the invention are directed to a method of servicing a remote radio unit (RRU)) at a mobile communications site, comprising the steps of: (a) providing a mobile communications site comprising: a vertical mounting structure resting on an underlying surface; a platform mounted to the vertical mounting structure; an RRU mounted on the platform; and an elevation mechanism attached to the platform and configured to move the platform relative to the mounting structure between raised and lowered positions relative to the underlying surface, wherein the platform is in its raised position; (b) lowering the platform to the lowered position; (c) servicing the RRU as the platform is in the lowered position; and (d) raising the platform to the raised position.

As a third aspect, embodiments of the invention are directed to a method of adjusting the coverage of a mobile communications site, comprising the steps of: (a) providing a mobile communications site comprising: a vertical mounting structure resting on an underlying surface; a platform mounted to the vertical mounting structure; an RRU mounted on the platform; an antenna connected to the RRU; and an elevation mechanism attached to the platform and configured to move the platform relative to the mounting structure vertically relative to the underlying surface; (b) determining the coverage area of the RRU and antenna; and (c) activating the elevation mechanism to adjust a height of the platform to modify the coverage area of the RRU and antenna.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are it to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to FIGS. 1-4, a mobile communications site, designated broadly at 10, is shown therein. The site 10 includes a vertical monopole tower 12 of largely conventional construction; in the illustrated embodiment, the monopole tower 12 is round in cross-section, although other configurations may also be suitable. The monopole tower 12 can be of any height, but is typically between about 15 and 40 meters in height.

Figure 1:
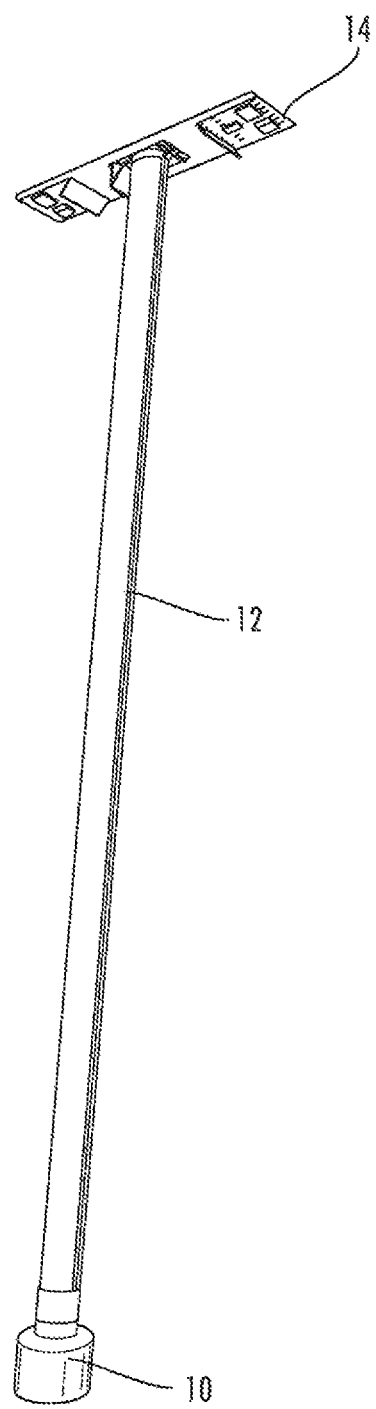
FIG. 1 is a bottom perspective view of an antenna tower and platform according to embodiments of the invention.
Figure 2:
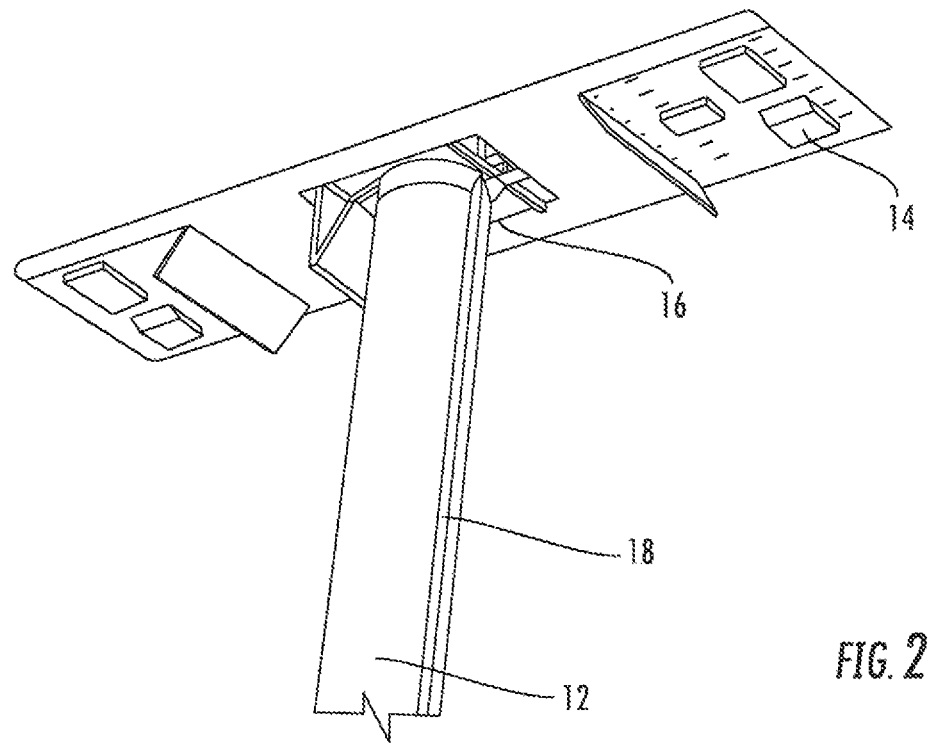
FIG. 2 is an enlarged bottom perspective view of a top portion the antenna tower and platform of FIG. 1.

A movable horizontal platform 14 is attached to the tower 12. The platform 14 serves as a mounting location for RRUs 40, antennas 50 and other mobile communications equipment and accessories (see FIG. 4). As shown in FIG. 2, the platform 14 includes a central opening 16 that is sufficiently large to receive the cross-section of the tower 12.

Figure 3:
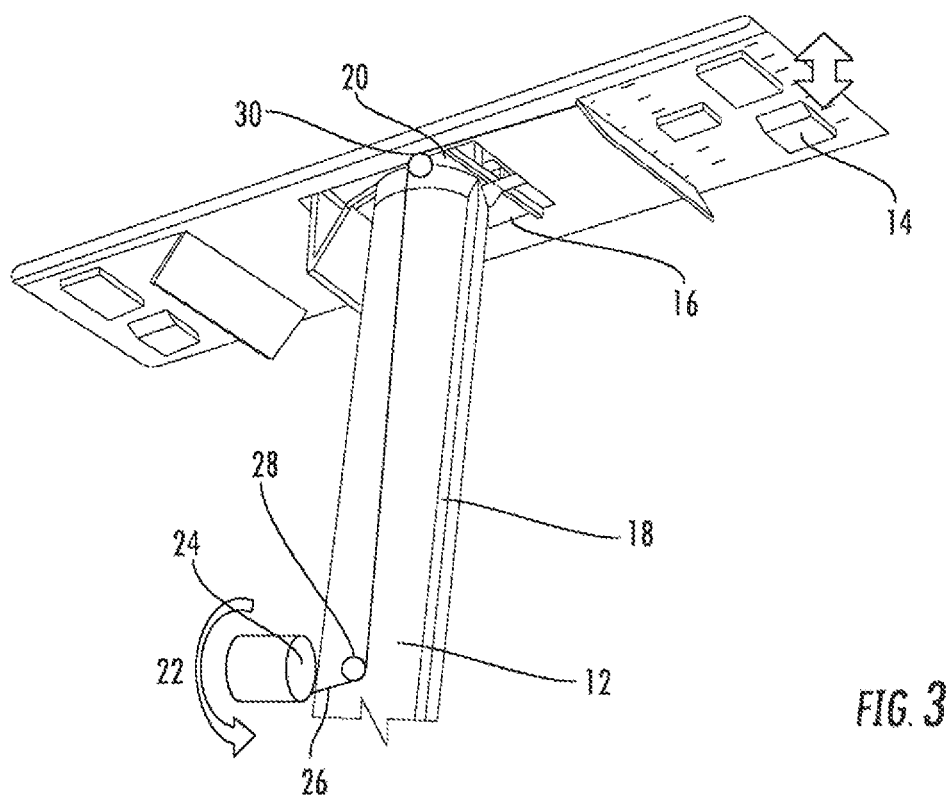
FIG. 3 is a schematic bottom perspective view of the top portion of the antenna tower and platform showing an exemplary elevation mechanism.

As can be seen in FIGS. 2 and 3, the platform 14 is mounted onto two vertical guide rails 18 that are in turn mounted to opposite sides of the tower 12. The platform 14 includes features 20 positioned adjacent opposite sides of the central opening 16 that engage with the guide rails 18 to enable the platform 14 to slide relative to the tower 12. The guide rails 18 and features 20 may take any number of different forms (e.g., a slotted rail and T-shaped block inserted into the slot, a solid rail and a C-shaped channel, or the like) that are recognized by those of skill in this art to be suitable for relative sliding movement.

As shown schematically in FIG. 3, an elevating mechanism 22 is attached to the platform 14. The elevating mechanism 22 is configured to drive the platform 14 up and down the tower 12 in a vertical path. The exemplary elevating mechanism shown in FIG. 3 comprises a DC motor 24 mounted at the base of the tower 12, a steel cable 26 attached to the platform 14, a lower pulley 28 mounted near the motor 24, and an upper pulley 30 mounted to the top portion of the tower 12. In some instances, the motor 24 may be stored in a cabinet at ground level that also houses other components (such as the BBUs, batteries, and the like).

Figure 4:
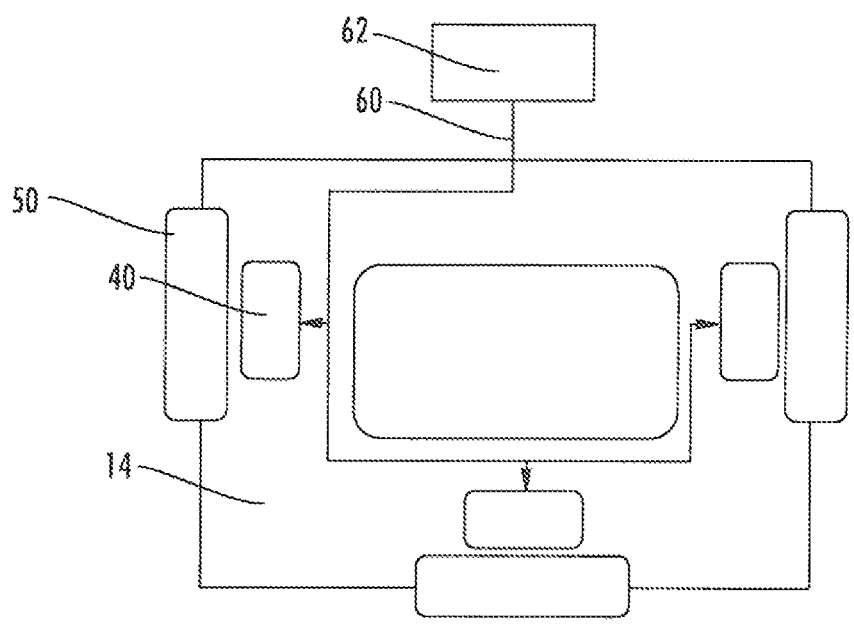
FIG. 4 is a schematic top view of the platform of FIG. 1 with two RRUs and two antennas mounted thereon.

Signal-carrying cables 60, such as fiber optic cables, power cables, hybrids of fiber and power cables, and, the like are routed from the ground (e.g., from a BBU 62) to the components mounted on the platform 14 (see FIG. 4). In some embodiments, it may be appropriate for the cables to be configured to be disconnected easily and quickly at the ground level. It may also be beneficial to utilize armored cables (e.g., armored hybrid power/fiber cables) for protection from moving parts.

The motor 24 is configured to cause the cable 26 to be taken up (for example, on a reel), which causes the platform 14 to rise to a raised position adjacent the top portion of the tower 12, and to cause the cable to be let out (again, for example, from a reel), which causes the platform 14 to descend to a lowered position adjacent the ground or other underlying surface. In either ease the platform 14 rises or descends while being guided by the rails 18; the presence of the rails 18 not only defines a vertical path for the platform 14 to follow, but also prevents the platform 14 from twisting relative to the tower 12 (i.e., from rotating about a vertical axis defined by the tower 12).

In normal operation, the platform 14 is in the raised position. However, if one of the RRUs 40 mounted on the platform 14 requires maintenance (e.g., replacement), the elevating mechanism 22 can be used to lower the platform 14 to the lowered position near the ground, where it can be more easily accessed by technicians that are either reluctant or unable to work on the platform 14 at the top of the tower 12. It may be advisable and/or necessary to disconnect the signal-carrying cables at ground level prior to lowering of the platform 14.

One additional advantage that may be realized with this concept regards site sector mapping and distribution. When mobile communications sites are constructed, typically the equipment is installed and set up with a particular coverage area in mind (which depends largely on the coverage of surrounding sites). The ability to raise and lower the platform 14 can enable a site's coverage area to be varied to avoid interference/overlapping with other sites, particularly newly constructed sites. Moreover, the platform 14 may be raised or lowered during occasional high traffic events. Such adjustment of the height of the platform 14 may be integrated with a central control system that also monitors other antennas and RRUs (and perhaps other platforms as well) and can adjust the height of the platform(s) in real time based on feedback from the antennas and/or RRUs.

Those of skill in this art will appreciate that the components discussed above may take different forms. For example, the tower 12 may be replaced with another type of mounting structure, such as a lattice tower or mast. The platform 14 may be configured differently; for example, the central opening 16 may be omitted, and the platform raised and lowered beside the tower (rather than the tower extending through the platform). The size of the platform 14 may also be smaller, with one unit installed on each separate leg of a lattice tower. The guides 18 and features 20 may be configured differently. The elevation mechanism 22 may employ chains, belts, and the like rather than cables, or may employ a telescoping arrangement (such as a telescoping pole) to raise and lower the platform 14. Other variations may also be used.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mobile communications site, comprising:
    a vertical mounting structure having a bottom portion resting on an underlying surface and a top portion;
    a movable horizontal platform mounted to the vertical mounting structure, the platform including features positioned on adjacent sides of a central opening in the platform that engage with guide rails on the mounting structure to enable the platform to slide relative to the mounting structure and prevent the platform from rotating relative to the mounting structure, wherein the mounting structure extends through the central opening when the platform is in the lowered position;
    one or more mobile communications components mounted on the platform; and
    an elevation mechanism attached to the platform and configured to move the platform between a raised position adjacent the top portion of the mounting structure and a lowered position adjacent the bottom portion of the mounting structure.

2. The mobile communications site defined in claim 1, wherein the mobile communications components comprise a remote radio unit (RRU).

3. The mobile communications site defined in claim 2, further comprising a base band unit (BBU) operatively associated with the RRU.

4. The mobile communications site defined in claim 3, wherein the BBU is operatively associated with the RRU via a signal-carrying cable.

5. The mobile communications site defined in claim 4, wherein the signal-carrying cable includes a connector that detaches the signal-carrying cable adjacent the underlying surface.

6. The mobile communications site defined in claim 4, wherein the signal-carrying cable is an armored cable.

7. The mobile communications site defined in claim 1, wherein the elevation mechanism includes a lower pulley mounted adjacent the underlying surface, an upper pulley mounted to the mounting structure near a top portion thereof, a cable attached to the platform that engages the lower and upper pulleys, and a drive unit configured to let out and draw in the cable.

8. A method of servicing a remote radio unit (RRU) at a mobile communications site, comprising the steps of:
   (a) providing a mobile communications site comprising:
      a vertical mounting structure having a bottom portion resting on an underlying surface and a top portion;
      a movable horizontal platform mounted to the vertical mounting structure, the platform including features positioned on adjacent sides of a central opening in the platform that engage with guide rails on the mounting structure to enable the platform to slide relative to the mounting structure and prevent the platform from rotating relative to the mounting structure, wherein the mounting structure extends through the central opening when the platform is in the lowered position;
      an RRU mounted on the platform; and
      an elevation mechanism attached to the platform and configured to move the platform between a raised position adjacent the top portion of the mounting structure and a lowered position adjacent the bottom portion of the mounting structure;
      wherein the platform is in its raised position;
   (b) lowering the platform to the lowered position;
   (c) servicing the RRU as the platform is in the lowered position; and
   (d) raising the platform to the raised position.

9. The method defined in claim 8, further comprising a base band unit (BBU) operatively associated with the RRU.

10. The method defined in claim 9, wherein the BBU is operatively associated with the RRU via a signal-carrying cable.

11. The method defined in claim 10, wherein the signal-carrying cable includes a connector that detaches the signal-carrying cable adjacent the underlying surface; and further comprising the step of detaching the signal-carrying cable prior to step (b).

12. The method defined in claim 10, wherein the signal-carrying cable is an armored cable.

13. The method defined in claim 8, wherein the elevation mechanism includes a lower pulley mounted adjacent the underlying surface, an upper pulley mounted to the mounting structure near a top portion thereof, a cable attached to the platform that engages the lower and upper pulleys, and a drive unit configured to let out and draw in the cable.

14. The method defined in claim 8, wherein step (c) comprises replacing the RRU with a second RRU.

15. The method defined in claim 8, wherein step (c) comprising adjusting the RRU to transmit to a different coverage area.

16. A method of adjusting the coverage of a mobile communications site, comprising the steps of:
   (a) providing a mobile communications site comprising:
      a vertical mounting structure having a bottom portion resting on an underlying surface and a top portion;
      a movable horizontal platform mounted to the vertical mounting structure, the platform including features positioned on adjacent sides of a central opening in the platform that engage with guide rails on the mounting structure to enable the platform to slide relative to the mounting structure and prevent the platform from rotating relative to the mounting structure, wherein the mounting structure extends through the central opening when the platform is in the lowered position;
      an RRU mounted on the platform;
      an antenna connected to the RRU; and
      an elevation mechanism attached to the platform and configured to move the platform between a raised position adjacent the top portion of the mounting structure and a lowered position adjacent the bottom portion of the mounting structure;
   (b) determining the coverage area of the RRU and antenna; and
   (c) activating the elevation mechanism to adjust a height of the platform to modify the coverage area of the RRU and antenna.

* * * * *